US007753716B2

(12) United States Patent  
Cox et al.

(10) Patent No.: US 7,753,716 B2
(45) Date of Patent: Jul. 13, 2010

(54) CAP FOR TELECOMMUNICATIONS CROSS CONNECT BLOCK

(75) Inventors: Larry R. Cox, Austin, TX (US); Sidney J. Berglund, Round Rock, TX (US); Jerome A. Pratt, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/424,221

(22) Filed: Apr. 15, 2009

(65) Prior Publication Data

US 2009/0197451 A1 Aug. 6, 2009

Related U.S. Application Data

(62) Division of application No. 12/108,187, filed on Apr. 23, 2008, now Pat. No. 7,530,836.

(60) Provisional application No. 60/914,863, filed on Apr. 30, 2007, provisional application No. 60/988,531, filed on Nov. 16, 2007.

(51) Int. Cl.
*H01R 4/24* (2006.01)
(52) U.S. Cl. .......................... 439/409; 439/276; 439/936
(58) Field of Classification Search .................. 439/409, 439/276, 936
See application file for complete search history.

(56) References Cited

U.S. PATENT DOCUMENTS

| 4,009,922 A | 3/1977 | Aysta |
| 4,127,312 A | 11/1978 | Fleischhacker et al. |
| 4,210,378 A | 7/1980 | Baribeau |
| 4,279,460 A | 7/1981 | Forberg |
| 4,326,767 A | 4/1982 | Silbernagel et al. |
| 4,341,430 A | 7/1982 | Crawford |
| 4,431,247 A | 2/1984 | Abdullah et al. |
| 4,533,196 A | 8/1985 | Forberg et al. |
| 4,789,354 A | 12/1988 | Smith et al. |

(Continued)

FOREIGN PATENT DOCUMENTS

CN 101350453 A 1/2009

(Continued)

*Primary Examiner*—Tho D Ta
(74) *Attorney, Agent, or Firm*—Gregg H. Rosenblatt

(57) ABSTRACT

An electrical connector assembly for terminating first and second electrical wires, the electrical connector assembly comprising a housing including a compartment for receiving first and second IDC elements and a cap movably mounted to the housing to cover the compartment. The cap is movable between an open position and a closed position. The cap includes a general body portion, a wire retention portion, and a latching mechanism. The wire retention portion includes first and second wire holders to retain and align the respective electrical wires within the housing for engagement with a gripping portion of the respective IDC element when the cap is placed in a closed position. The gripping force of the wire holders is less than a gripping force of the IDC elements. The latching mechanism can releasably fasten the cap to the housing when the cap is placed in a closed position. When the cap is returned to an open position after the cap was placed in the closed position, the first and second wires are retained by the first and second IDC elements and the first and second wire holders disengage the first and second wires from the cap.

4 Claims, 14 Drawing Sheets

U.S. PATENT DOCUMENTS

| | | | |
|---|---|---|---|
| 4,815,988 | A | 3/1989 | Scherer |
| 5,147,218 | A | 9/1992 | Matthews et al. |
| 5,175,662 | A | 12/1992 | DeBalko et al. |
| 5,178,558 | A | 1/1993 | Knox et al. |
| 5,281,163 | A | 1/1994 | Knox et al. |
| 5,451,170 | A | 9/1995 | Suffi |
| 5,496,192 | A | 3/1996 | Hower et al. |
| 5,504,654 | A | 4/1996 | Knox et al. |
| 5,577,930 | A | 11/1996 | Dahlem et al. |
| 5,860,829 | A | 1/1999 | Hower et al. |
| 6,010,372 | A | 1/2000 | Ward |
| 6,299,475 | B1 | 10/2001 | Huspeni et al. |
| 6,811,430 | B1* | 11/2004 | Carrico et al. ............. 439/409 |
| 6,875,044 | B1 | 4/2005 | Lee |
| 7,059,864 | B2 | 6/2006 | Matthies et al. |
| 7,066,764 | B2 | 6/2006 | Bolouri-Saransar |
| 7,156,686 | B1 | 1/2007 | Sekela et al. |
| 7,165,983 | B1 | 1/2007 | Fasce et al. |
| 7,335,049 | B2 | 2/2008 | Alarcon et al. |
| 7,458,840 | B2 | 12/2008 | Pratt |
| 2005/0170682 | A1 | 8/2005 | Kim et al. |
| 2005/0250389 | A1 | 11/2005 | Johansen et al. |
| 2006/0057884 | A1* | 3/2006 | Fasce et al. ................ 439/409 |

FOREIGN PATENT DOCUMENTS

| | | |
|---|---|---|
| GB | 2 129 630 A | 5/1984 |
| JP | 09-092356 | 4/1997 |
| JP | 2000-175226 | 6/2000 |
| WO | WO 2007/102983 A1 | 9/2007 |

\* cited by examiner

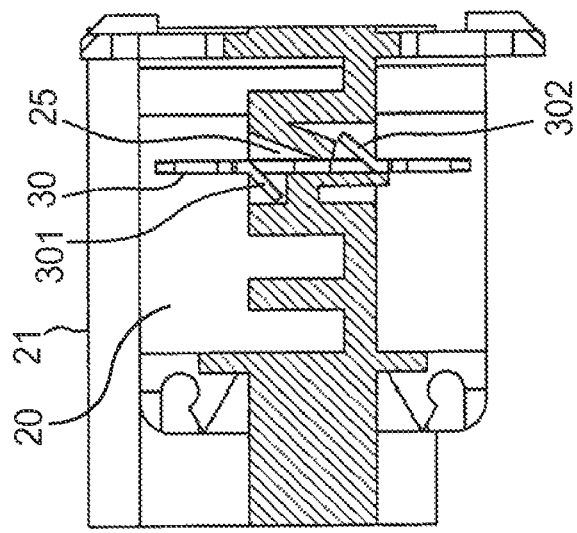
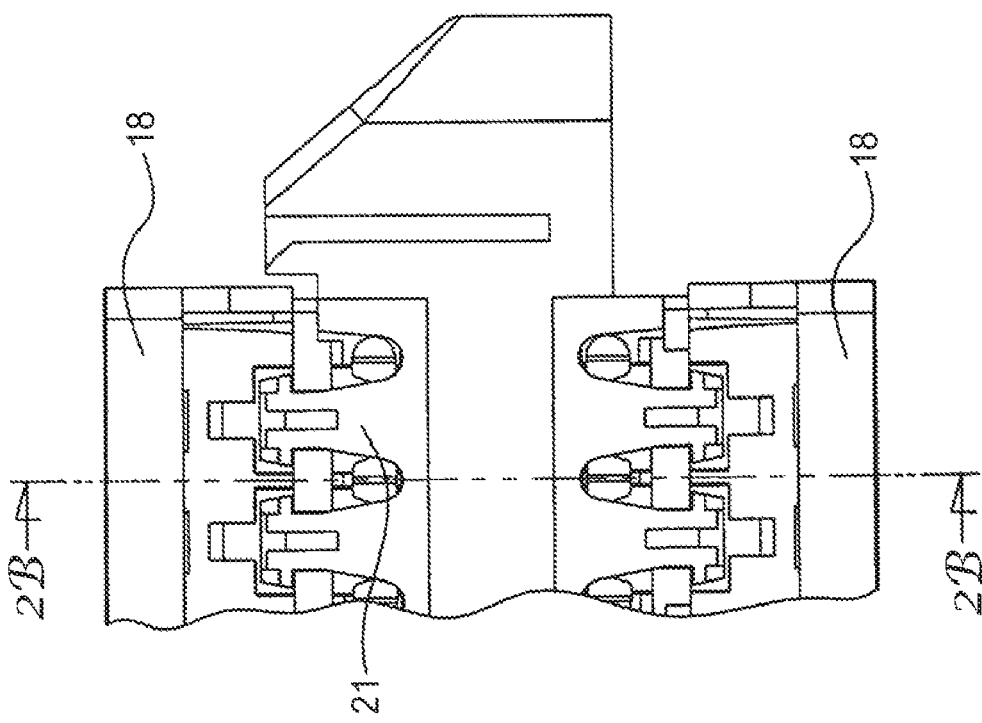

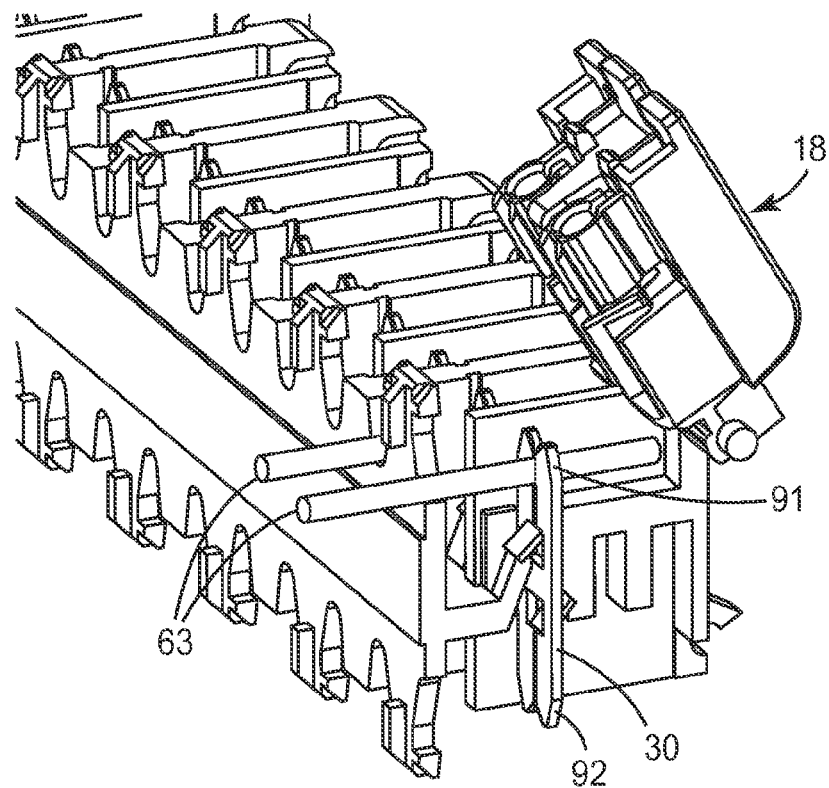
FIG. 12
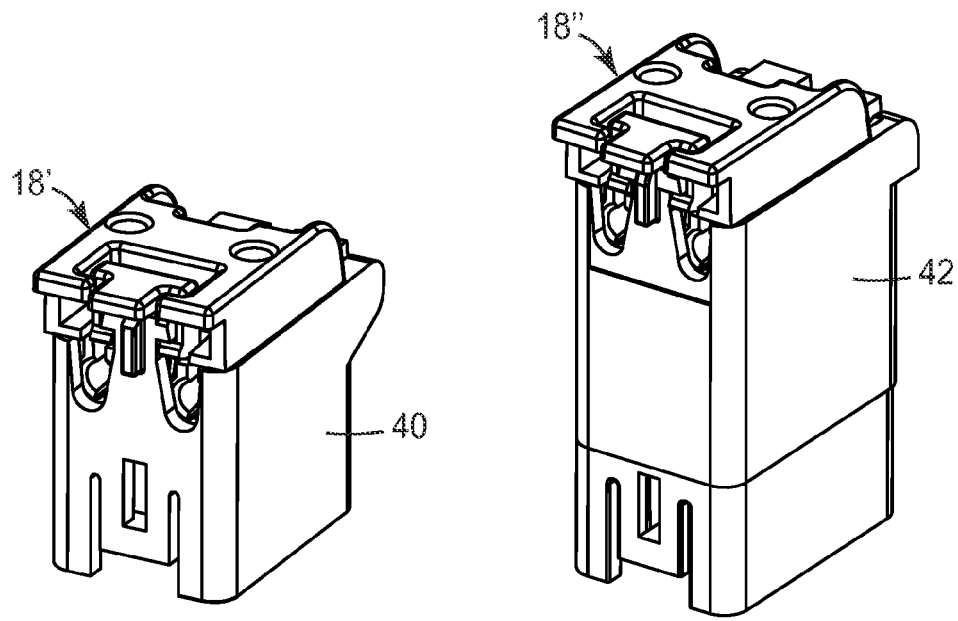
FIG. 13
FIG. 14

CAP FOR TELECOMMUNICATIONS CROSS CONNECT BLOCK

CROSS REFERENCE TO RELATED APPLICATIONS

This application is a divisional of U.S. application Ser. No. 12/108,187, filed Apr. 23, 2008, now U.S. Pat. No. 7,530,836 which claims the benefit of U.S. Provisional Application Ser. No. 60/914,863 filed on Apr. 30, 2007; and U.S. Provisional Application Ser. No. 60/988,531, filed on Nov. 16, 2007. The disclosures of each aforementioned Application are incorporated by reference herein in their entirety.

FIELD

The present invention relates to an electrical connector assembly, more specifically a terminal block or a cross connect block. In a particular aspect, the present invention relates to an electrical connector assembly for housing an insulation displacement element for use in making an electrical connection with an electrical conductor, where the connector assembly includes a multifunctional cap to provide straightforward installation of the electrical conductors being connected.

BACKGROUND

In a telecommunications context, connector blocks are connected to cables that feed subscribers while other connector blocks are connected to cables to the central office. To make the electrical connection between the subscriber block and the central office block, jumper wires are inserted to complete the electrical circuit. Typically jumper wires can be connected, disconnected, and reconnected several times as the consumer's service needs change. The connector blocks are often implemented in an electrical connector assembly, sometimes referred to as a terminal block or a cross connect block.

An insulation displacement connector, or "IDC element," can be used to make the electrical connection to a wire or electrical conductor. The IDC element displaces the insulation from a portion of the electrical conductor when the electrical conductor is inserted into a slot within the IDC element such that the IDC element makes electrical connection to the electrical conductor. Once the electrical conductor is inserted into the slot, and the wire insulation is displaced, electrical contact is made between the conductive surface of the IDC element and the conductive core of the electrical conductor.

Typically the IDC element is disposed in an insulated housing. The housing has a cap or other moveable member that is used to press the electrical conductor into contact with the IDC element. In some conventional implementations, the electrical conductor is inserted in the housing and then the cap is closed. However, the user often cannot visually verify that a proper connection with the IDC element has been made.

Conventional cross connect blocks are known. For example, see U.S. Pat. Nos. 4,210,378; 4,431,247; 4,815,988; 4,279,460; 4,789,354; 4,341,430; 4,533,196; 4,127,312; 5,147,218; 5,281,163; 5,281,163 and GB. Patent No. 2,129,630.

SUMMARY

In a first aspect of the present invention, an electrical connector assembly for terminating first and second electrical wires is provided. The electrical connector assembly comprises a housing including a compartment for receiving first and second IDC elements and a cap movably mounted to the housing to cover the compartment, wherein the cap is movable between an open position and a closed position. The cap includes a general body portion, a wire retention portion, and a latching mechanism. The wire retention portion includes first and second wire holders, each formed of a flexible material, to receive and hold the respective first and second electrical wires, the first and second wire holders each having a generally cylindrical shape and each comprising a slit formed along the length of the wire holder. The wire holder retains and aligns the respective electrical wire within the housing for engagement with a gripping portion of the respective IDC element when the cap is placed in a closed position. The gripping force of the wire holder is less than the gripping force of the IDC element. The latching mechanism can releasably fasten the cap to the housing when the cap is placed in a closed position. With this configuration, when the cap is placed in the open position after the cap was placed in the closed position, the first and second wires are retained by the first and second IDC elements and the first and second wire holders disengage the first and second wires.

In another aspect of the invention, a cap movably mountable to a base portion of an IDC block and configured to cover a compartment having first and second IDC elements includes a general body portion, a wire retention portion, and a latching mechanism. The wire retention portion includes first and second wire holders, each formed of a flexible material, to receive and hold the respective first and second electrical wires, the first and second wire holders each having a generally cylindrical shape and each comprising a slit formed along the length of the wire holder. The wire holder retains and aligns the respective wire within the housing for engagement with a gripping portion of the respective IDC element when the cap is placed in a closed position. The gripping force of the wire holder is less than the gripping force of the IDC element. The latching mechanism can releasably fasten the cap to the housing when the cap is placed in a closed position. With this configuration, when the cap is placed in the open position after the cap was placed in the closed position, the first and second wires are retained by the first and second IDC elements and the first and second wire holders disengage the first and second wires.

In another aspect of the invention, a cap, movably mountable to a base portion of an IDC block and configured to cover multiple, gel-filled terminal compartments, each compartment having first and second IDC elements, comprises a general body portion having an elongated cover configured to cover a plurality of gel-filled terminal compartments. The cap also includes a gel displacement portion formed on an underside of the general body portion that includes a plurality of ramped wire guides each shaped with a pushing slope to force gel disposed within the terminal compartment to move toward an IDC element housed in the terminal compartment. The cap also includes a latching mechanism to releasably fasten the cap to the housing when the cap is placed in a closed position.

In another aspect of the invention, a method of installing a wire pair in a terminal block assembly comprises providing the electrical connector assembly described above. The cap is placed in an open position. The first and second wires of the wire pair are inserted in the first and second wire holders, respectively, until ends of the wires contact a rear wall portion of the cap. The cap is closed onto the compartment, wherein the latching mechanism of the cap is engaged by a corresponding boss formed in the housing. The first and second wires are engaged by respective first and second IDC elements when the cap is placed in the closed position. When the cap is placed in the open position after the cap has been placed in the closed position, the first and second wires are retained by the first and second IDC elements and the first and second wire holders disengage from the first and second wires.

In another aspect of the invention, an electrical device that terminates at least a first electrical wire, comprises a base including at least a first IDC element housed therein and electrically coupled to the electrical device. In addition, the device includes a cap movably mounted to the base, wherein the cap is movable between an open position and a closed position. The cap includes a general body portion and a wire retention portion comprising a first wire holder to receive and hold the first electrical wire. The first wire holder has a generally cylindrical shape and comprises a slit formed along the length of the wire holder, wherein the wire holder retains and aligns the first electrical wire for engagement with a gripping portion of the first IDC element when the cap is placed in a closed position, wherein a gripping force of the wire holder is less than a gripping force of the IDC element. Also, the cap includes a latching mechanism to releasably fasten the cap to the base when the cap is placed in a closed position. In one aspect, the base includes a plurality of IDC elements, and wherein the cap includes a corresponding plurality of wire holders to receive and hold a plurality of electrical wires. In another aspect, the device is a printed circuit board.

BRIEF DESCRIPTION OF THE DRAWINGS

FIG. 2A is a view of a portion of an exemplary electrical connector assembly according to an aspect of the invention.

FIG. 2B is a cross section view of FIG. 2A showing an IDC terminal element disposed in a base portion of an exemplary electrical connector assembly according to an aspect of the invention.

FIG. 12 is a close-up cut away isometric view of a portion of an electrical connector assembly and cap after installation of a wire pair, with the cap being returned to an open position according to an aspect of the invention.

FIG. 13 is an isometric view of a jumper device according to another aspect of the invention.

FIG. 14 is an isometric view of a protection device according to another aspect of the invention.

While the above-identified figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the spirit and scope of the principals of this invention. The figures may not be drawn to scale. Like reference numbers have been used throughout the figures to denote like parts.

DETAILED DESCRIPTION

Figure 1A:
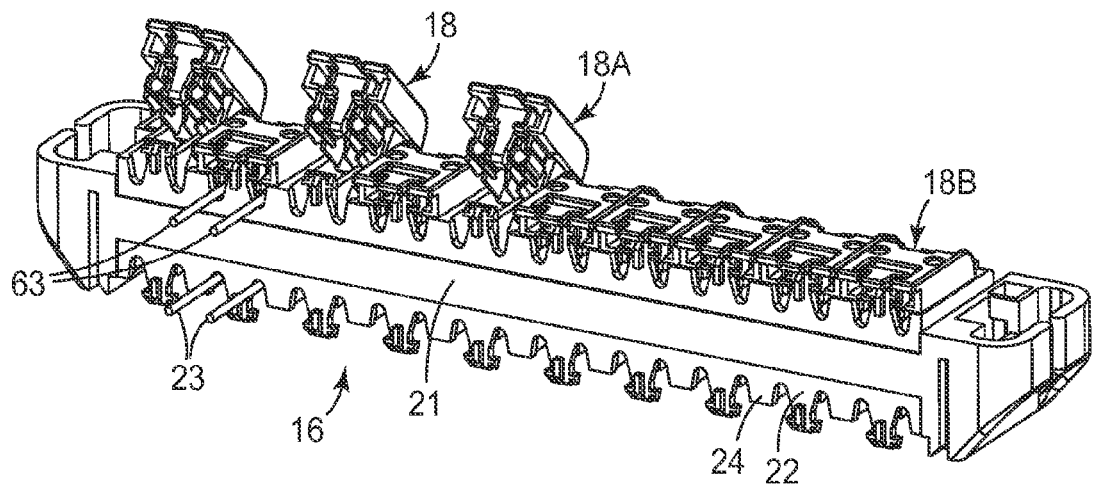
FIG. 1A is an isometric view of an exemplary electrical connector assembly according to an aspect of the invention.

FIG. 1A shows an electrical connector assembly 16, sometimes referred to herein as a terminal block or a cross connect block. In an exemplary aspect, cross connect block 16 has a generally rectangular structure. For example, in alternative aspects, cross connect block 16 can have a right rectangular prism structure, a box-like regular parallel piped or rectangular solid structure, or a rectangular parallel piped structure. Cross connect block 16 includes a base 21 and a plurality of covers or caps 18 arranged on upper and lower sides of the base 21. In particular, FIG. 1A shows a plurality of caps 18 arranged on the upper side of base 21, where cap 18A is shown in an open position and cap 18B is shown in a closed position. Although not shown, a plurality of caps 18 can be arranged on the lower side of base 21. In an alternative aspect, the lower side of base 21 can include a plurality of caps having a different construction, as is explained in further detail below.

Figure 1B:
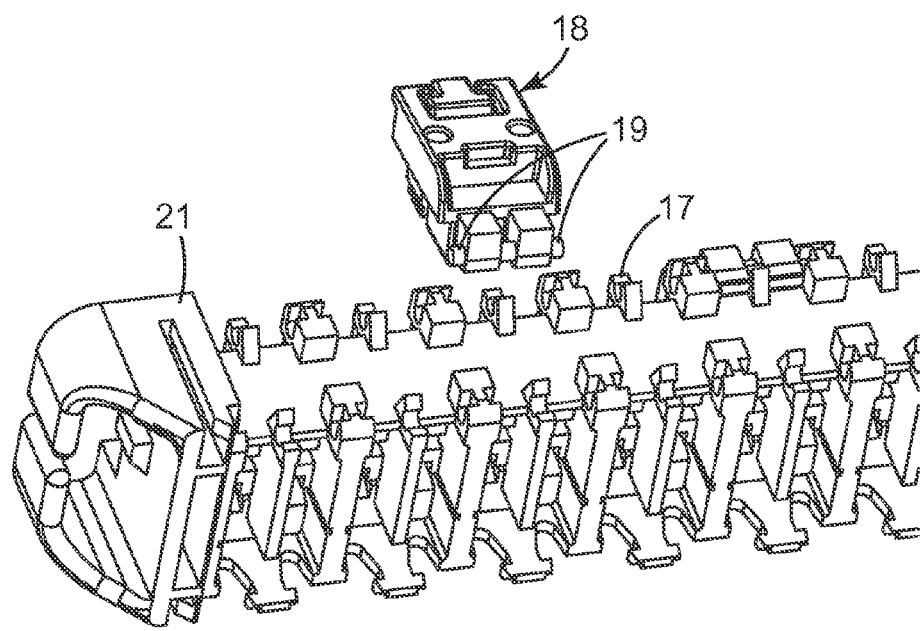
FIG. 1B is another isometric view of a portion of an exemplary electrical connector assembly according to an aspect of the invention.

As shown in FIG. 1B, cap 18 can be coupled, e.g., pivotally mounted, to base 21 via a set of trunnions or pivots 19 engaging a corresponding set of trunnion mounts or pivot mounts 17 formed on base 21. In a preferred aspect, the pivoting mechanism can provide for a cap rotation of about 90 degrees or greater. In accordance with exemplary aspects of the present invention, and as described in further detail below, cap 18 can provide straightforward installation of the electrical wires being connected in the cross connect block as the wires are first installed in the cap 18 at a convenient orientation or cap angle. This configuration can facilitate more straightforward installation in high density arrangements where the distance between blocks is close.

FIG. 2B shows a cross section of the cross connect block 16 taken along line 2B-2B in FIG. 2A, and shows that the base 21 has a plurality of terminals 30. The terminals 30 are used to electrically connect a first set of wires 23 and a second set of wires 63 (shown in FIG. 1A). Typically, the wires 23, 63 can be "Tip" and "Ring" twisted wire pairs. Any standard telephone wire with PVC insulation (or other conventional insulation) may be used as the electrical conductor. The wires may be, but are not limited to: 22 AWG (rounded copper wire nominal diameter 0.025 inches (0.65 mm) with nominal PVC insulation thickness of 0.010 inches (0.023 mm)); 24 AWG (rounded copper wire nominal diameter 0.020 inches (0.5 mm) with nominal PVC insulation thickness of 0.010 inches (0.025 mm)); 26 AWG (rounded copper wire nominal diameter 0.016 inches (0.4 mm) with nominal PVC insulation thickness of 0.010 inches (0.025 mm)). Although the embodiments described herein are specifically directed to cross connect blocks for twisted wire pairs, as would be apparent to one of ordinary skill in the art given the present description, the connector assembly can be modified to connect a single wire or single wire sets as well using a single wire cap or set of single wire caps (see e.g., FIG. 17). Further, in another alternative aspect, the cap can be configured to hold and connect one or more wires (1, 2, 3, 4, 5, or more) to one or multiple IDC elements of a block, a printed circuit board, or other electrical or telecommunications device. (see e.g., FIGS. 18A and 18B).

The base 21 can be preferably formed with thermoplastic electrically insulative plastic filled with glass fibers. For example, base 21 may be constructed of an engineering plastic such as, but not limited to: Valox® 325, a polybutylene terephthalate (PBT) polymer, available from GE Plastics of Pittsfield, Mass.; Lexan® 500R, a flame retardant polycarbonate resin, with 10% glass fiber available from GE Plastics of Pittsfield, Mass.; Makralon® 9415, a flame retardant polycarbonate resin, with 10% glass fiber reinforcement available from Bayer Plastics Division of Pittsburgh, Pa.; or Makralon® 9425, a polycarbonate resin, flame retardant, 20% glass fiber reinforced grade available from Bayer Plastics Division of Pittsburgh, Pa.

Generally, several compartments (an exemplary compartment 20 is shown in FIG. 2B) are formed on the upper and lower surfaces of the base 21. For example, as shown in FIG. 1A, base 21 includes 10 pairs of compartments (upper and lower). Also, a plurality of sets of slots 25 for holding the terminals 30 are formed in the base 21 (see FIG. 2B). The above-mentioned base materials can provide excellent electrical insulation to the terminals 30 in the slots 25, and can provide sufficient strength required for the engagement of the wires and the terminals 30. The compartments are structures designed for preventing the base from warping and deforming easily in the thermoplastic molding process. The upper and lower sides of the base 21 both have posts 22 and 24, and the groove disposed between the posts 22 and 24 can help to align the first set of wires 23 and the second set of wires 63 held in the caps 18. Thus, the size of the groove between the posts 22 and 24 can be slightly greater than the outer diameter of the wires.

Figure 3A:
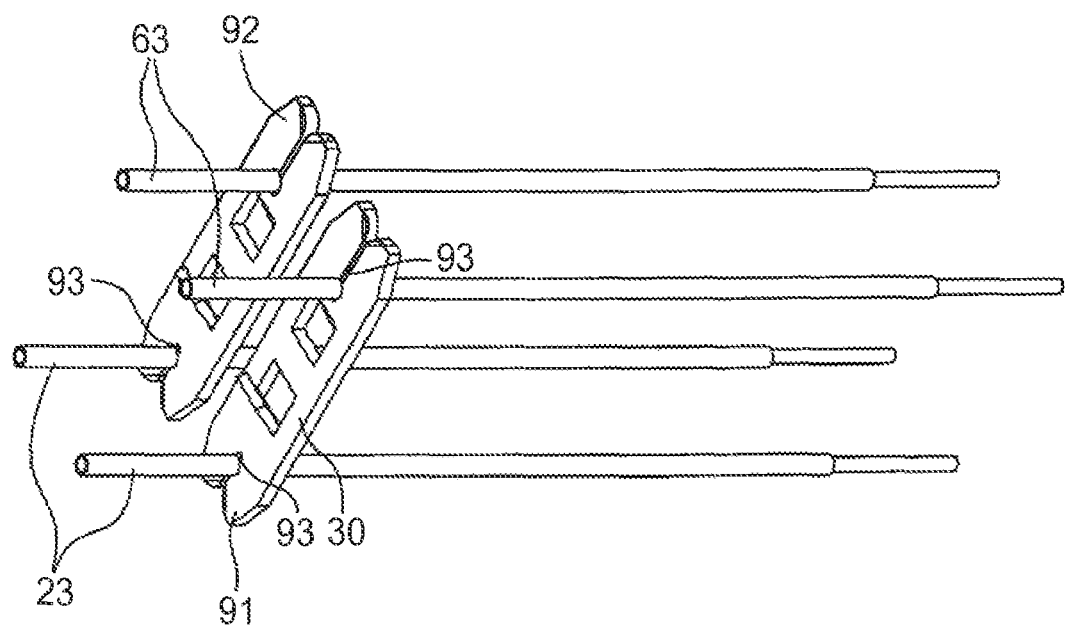
FIG. 3A is an isometric view of an IDC terminal element according to another aspect of the invention.
Figure 3B:
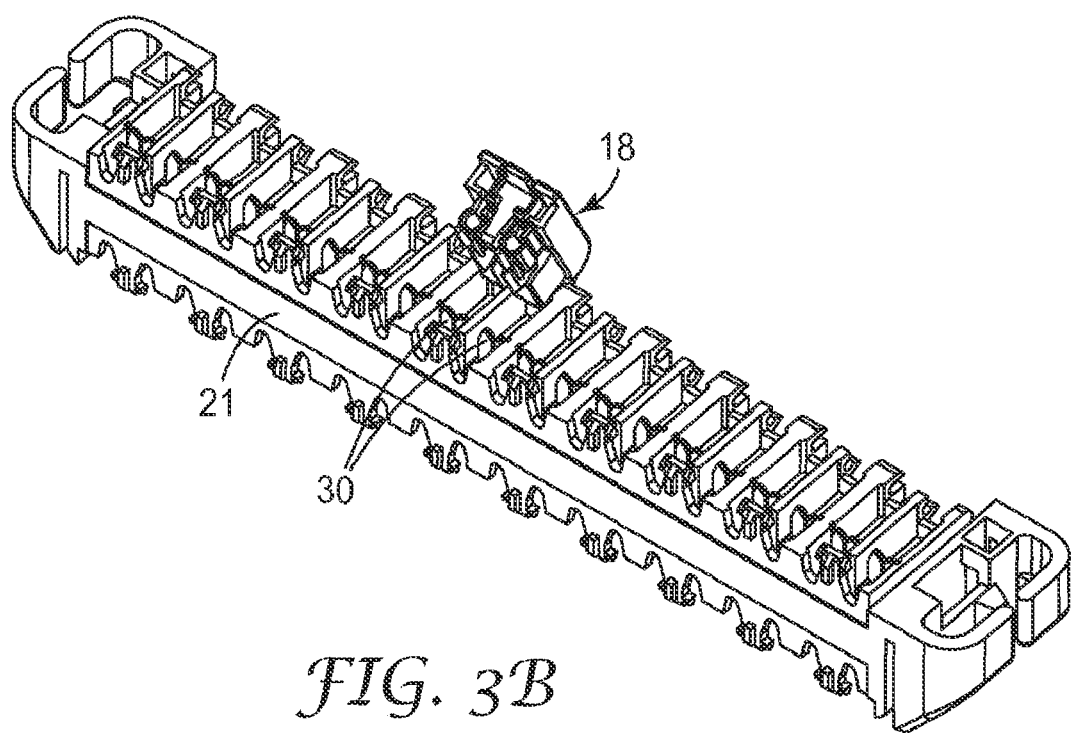
FIG. 3B is another isometric view of an IDC terminal element in an exemplary electrical connector assembly according to another aspect of the invention.

FIG. 3A shows the structure of a terminal 30, preferably an IDC terminal (also referred to herein as an IDC element 30). FIG. 3B shows terminals 30 installed in base 21. The terminal can be disposed in a terminal compartment 20 (see FIG. 2B) of the electrical connector assembly 16. The terminal compartment can also be filled with a sealant, such as a conventional gel, to help prevent moisture from entering the terminal compartment and corroding the terminal.

Sealant materials useful in the exemplary embodiments include greases and gels, such as, but not limited to RTV® 6186 mixed in an A to B ratio of 1.00 to 0.95, available from GE Silicones of Waterford, N.Y. Gels, which can be described as sealing material containing a three-dimensional network, have finite elongation properties which allow them to maintain contact with the elements and volumes they are intended to protect. Gels, which are useful herein, may include formulations which contain one or more of the following: (1) plasticized thermoplastic elastomers such as oil-swollen Kraton triblock polymers; (2) crosslinked silicones including silicone oil-diluted polymers formed by crosslinking reactions such as vinyl silanes, and possibly other modified siloxane polymers such as silanes, or nitrogen, halogen, or sulfur derivatives; (3) oil-swollen crosslinked polyurethanes or ureas, typically made from isocyanates and alcohols or amines; (4) oil swollen polyesters, typically made from acid anhydrides and alcohols. Other gels are also possible. Other ingredients such as stabilizers, antioxidants, UV absorbers, colorants, etc. can be added to provide additional functionality if desired. Useful gels may have ball penetrometer readings of between 15 g and 40 g when taken with a 0.25 inch diameter steel ball and a speed of 2 mm/sec to a depth of 4 mm in a sample contained in a cup such as described in ASTM D217 (3 in diameter and 2.5 in tall cylinder filled to top). Further, they may have an elongation as measured by ASTM D412 and D638 of at least 150%, and more preferred at least 350%. Also, these materials may have a cohesive strength, which exceeds the adhesive strength of an exposed surface of the gel to itself or a similar gel.

Representative formulations include gels made from 3-15 parts Kraton® G1652, a styrene ethylene butylene styrene (SEBS) block copolymer available from Kraton Polymers, LLC, Houston, Tex., and 90 parts petroleum oil, optionally with antioxidants to slow decomposition during compounding and dispensing.

The IDC element 30 can comprise a conductive metal material. In one exemplary embodiment, the IDC element 30 may be constructed of phosphor bronze alloy C51000 per ASTM B103/103M-98e2 with reflowed matte tin plating of 0.000150-0.000300 inches thick, per ASTM B545-97 (2004) e2 and electrodeposited nickel underplating, 0.000050 inches thick minimum, per SAE-AMS-QQ-N-290 (July 2000).

The IDC element 30 can have two ends that are substantially U-shaped. For example, a first end 91 and a second end 92 each have a U-shaped slot 93 formed therein (see FIG. 3A). The U-shaped slots 93 are configured to engage the first set of wires 23 and the second set of wires 63 respectively. The U-shaped ends have a structure that can displace the insulative layers of the wires inserted in them to allow contact with conductors in the wires.

As shown in FIG. 2B, the IDC elements 30 can be fixed in the slots 25 of the base 21. In a preferred aspect, the open ends of the substantially U-shaped slots 93 of the IDC elements 30 can be chamfered or rounded. Preferably, the width of the slots 25 is approximately equal to or slightly greater than the thickness of the IDC elements 30, such that the IDC elements 30 are held and will not shake or rotate in the base 21. Also, members or barbs 301, 302 with a width greater than that of the slots 25 can be formed in regions besides the electrical contact regions of the terminals, and spaces for accommodating the members or barbs 301, 302 are formed in the slots 25. When the depth that IDC elements 30 are inserted in the slots 25 reaches a certain value, the members or barbs 301, 302 are released from the narrow width of the slots 25, and are secured in the accommodating spaces. Thus, the IDC elements can be secured in the slots 25, and are prevented from sliding vertically.

In further detail, FIGS. 4-12 show various views of exemplary cap 18. Cap 18 is configured to cover a terminal compartment of the cross connect block. In addition, cap 18 provides for the connection of one set of wires, such as wires 63, to another set of wires via an IDC element simply by closing the cap 18. In addition, once a wire is secured in the IDC element 30, raising the cap 18 (to the open position) does not remove or disengage the connected wire from the IDC element. Moreover, the cap 18 includes a self engaging and releasable latching mechanism that can be hand-actuated and that can withstand multiple openings and closings. Cap 18 also provides testing access to test the terminals and a visual inspection area for verification of wire positioning. While the caps 18 shown in FIGS. 4-12 are exemplary single cap constructions, multiple caps 18 can be integrally formed together (e.g., to open and close in unison), as would be apparent to one of ordinary skill in the art given the present description.

In an exemplary aspect, cap 18 includes a general body portion 101, a wire retention portion 102 and a latching mechanism 120. Optionally, cap 18 can further include a test access area 140 and a visual inspection area 150. Main body portion 101, which can be formed from an insulative material, has a generally rectangular shape to cover the IDC terminal compartment of the cross connect block 16. The cap 18 may be constructed of an engineering plastic such as, but not limited to: Ultem® 1100, a polyether imide resin available from GE Plastics of Pittsfield, Mass.; Valox® 420 SEO, a polybutylene terephthalate (PBT) resin flame retardant, up to 20% glass fiber reinforced available from GE Plastics of Pittsfield, Mass.; IXEF® 1501, a polyarylamide resin, flame retardant, up to 20% glass fiber reinforced grade available from Solvay Advanced Polymers, LLC of Alpharetta, Ga.; or IXEF® 1521, a polyarylamide resin, flame retardant, up to 20% glass fiber reinforced grade available from Solvay Advanced Polymers, LLC of Alpharetta, Ga. In a preferred aspect, the material used to form cap 18 can include a flexible plastic material such as Makralon® 2658, 2850, 2407, or 2607 polycarbonate resins available from Bayer Plastics Division of Pittsburgh, Pa. In one aspect, the material used to form cap 18 can be substantially transparent. In another aspect, material used to form cap 18 can be opaque.

Figure 4A:
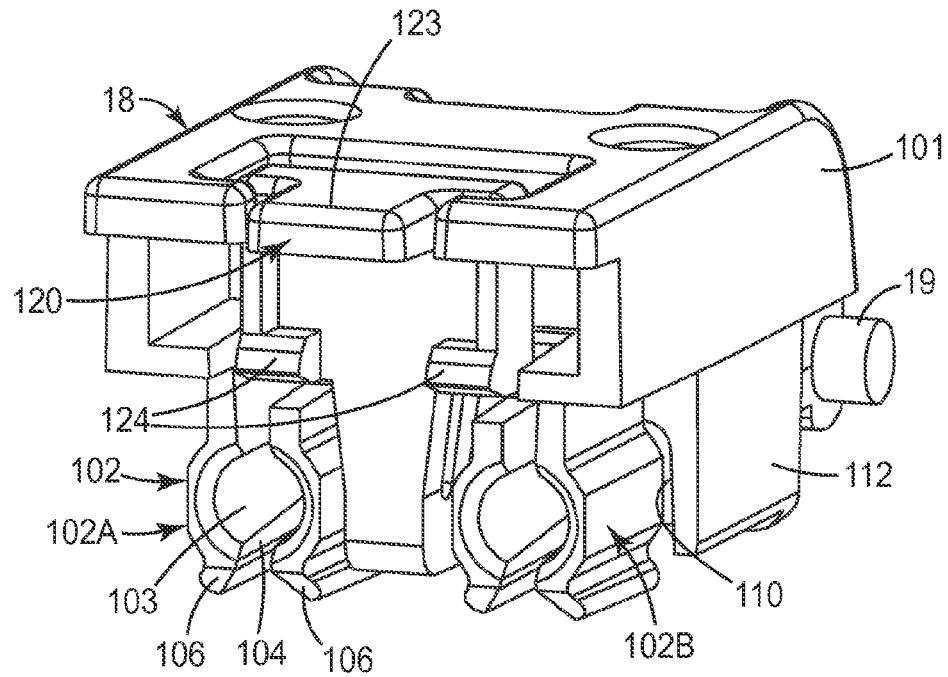
FIG. 4A is an isometric front view of an exemplary cap according to another aspect of the invention.

Each cap 18 includes a wire retention portion 102, in FIG. 4A shown as wire holders 102A and 102B. The wire holders 102A, 102B have a generally cylindrical or tubular shape, with each including an opening 103 having a size configured to receive and support a conventional wire, such as those described above. As shown, the wire holders are preferably positioned below the top surface of the cap and are aligned with the IDC elements disposed in the body 21. The wire holders 102A and 102B can have the same appearance or they can be different. For example, the opening of wire holder 102B may be distinguishable (e.g., different shape, different color, etc.) from the opening of wire holder 102A to indicate that a particular wire should be inserted in holder 102B as opposed to 102A.

Figure 6:
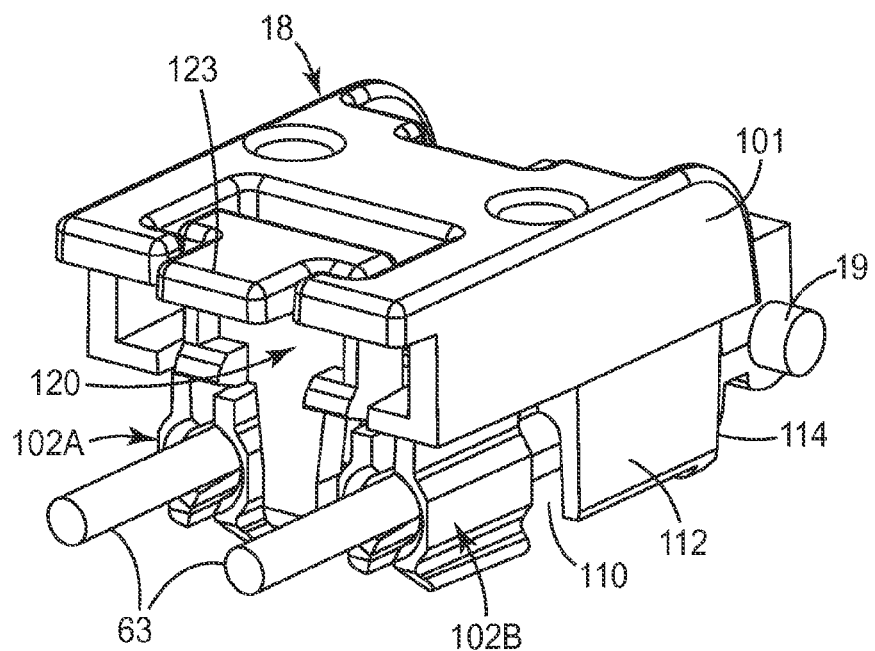
FIG. 6 is an isometric view of an exemplary cap holding a wire pair according to another aspect of the invention.
Figure 7:
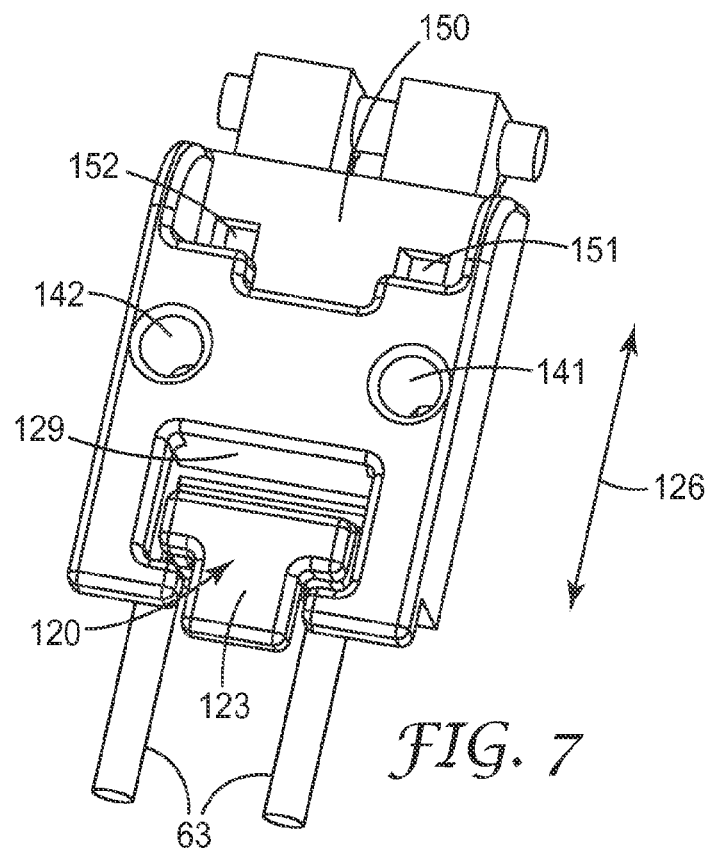
FIG. 7 is an isometric top view of an exemplary cap holding a wire pair according to another aspect of the invention.
Figure 10:
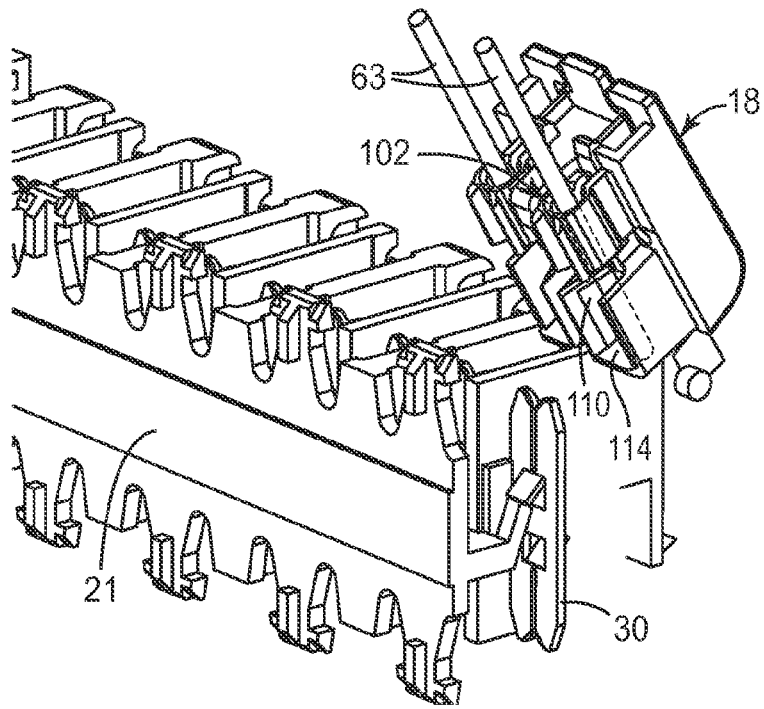
FIG. 10 is a close-up cut away isometric view of a portion of an electrical connector assembly and cap holding a wire pair in an open position according to an aspect of the invention.

In operation, wires 63 can be inserted through openings 103 until the end of the wire reaches a back-wall portion 114 of cap 18 (see FIG. 6 and also the cut-away view shown in FIG. 10). The cap 18 also includes an opening or transverse gap 110 that is configured to receive the IDC element 30 as the cap is being closed, such that when the cap is moved to a closed position on the base 21, the transverse gap 110 is in a corresponding position to the IDC element 30 and the slot 25. The width of the transverse gap 110 is slightly greater than the thickness of the IDC element 30. Thus, the cap 18 can be opened and closed repeatedly without directly contacting the IDC element 30.

Figure 4B:
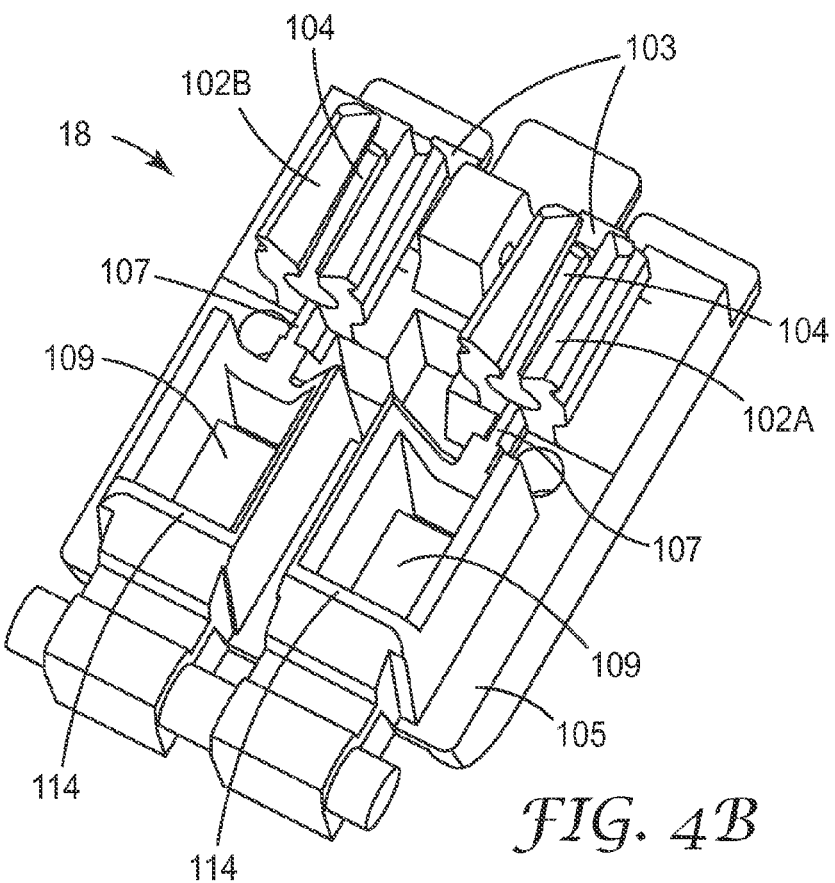
FIG. 4B is an isometric bottom view of an exemplary cap according to another aspect of the invention.

As shown in FIG. 4B, which provides a view of cap 18 from underneath the cap, transverse gap 110 may include first and second protrusions 107 disposed therein, which protrude from surface 105. Protrusions 107 can physically engage with the inserted wires to push the wires into the openings of the IDC elements during cap closure. In addition, the cap 18 can also include guide areas 109 which help maintain the transverse positions of the wires as they are inserted until contact with rear wall 114 and during connection.

Figure 4C:
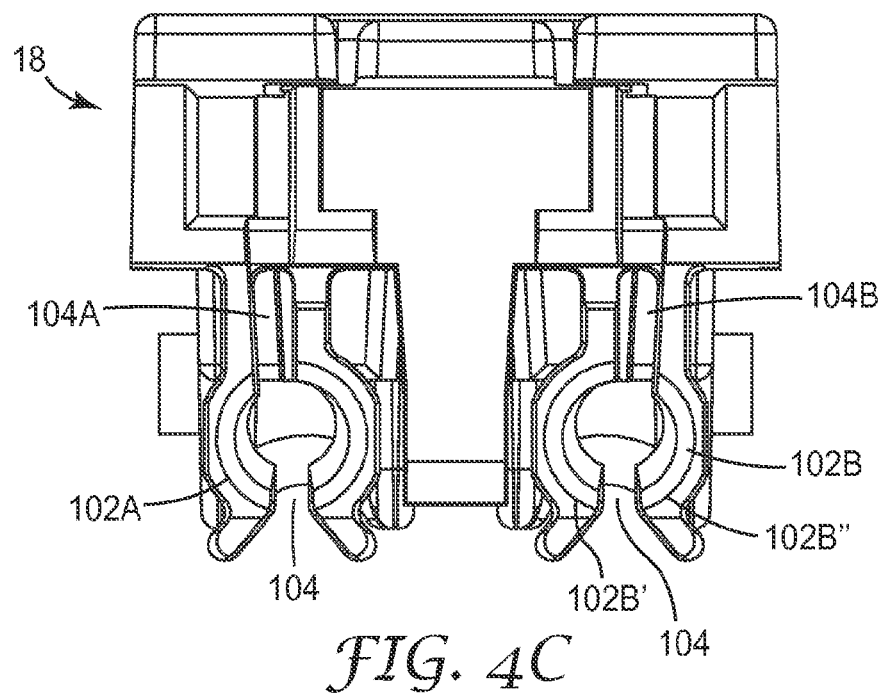
FIG. 4C is a front view of an alternative exemplary cap according to another aspect of the invention.
Figure 4D:
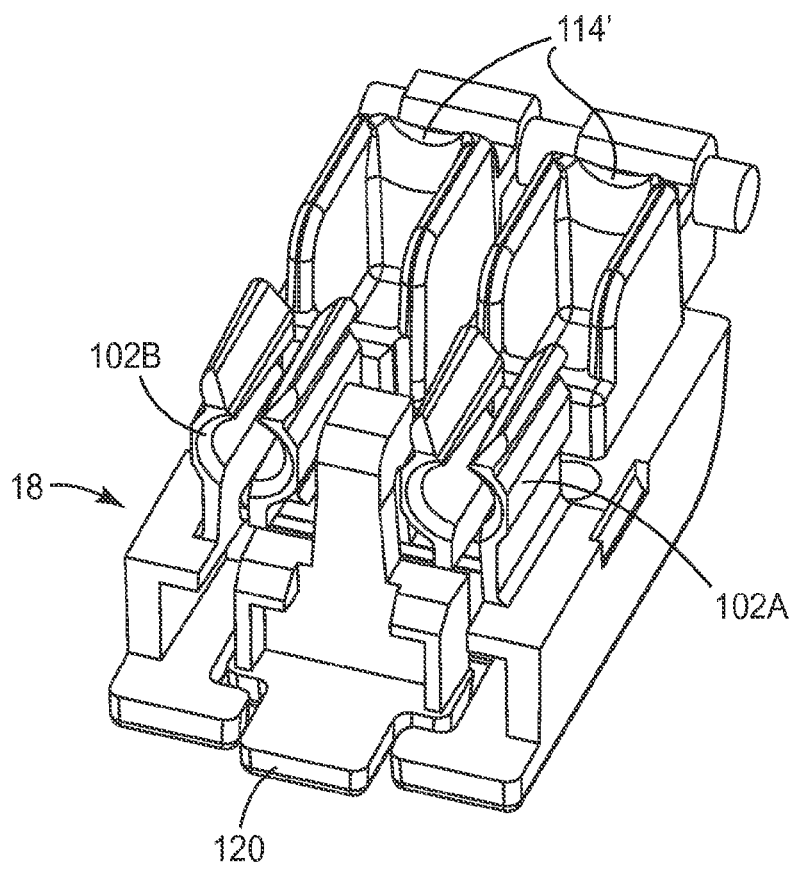
FIG. 4D is an isometric bottom view of an alternative cap according to another aspect of the invention.
Figure 5:
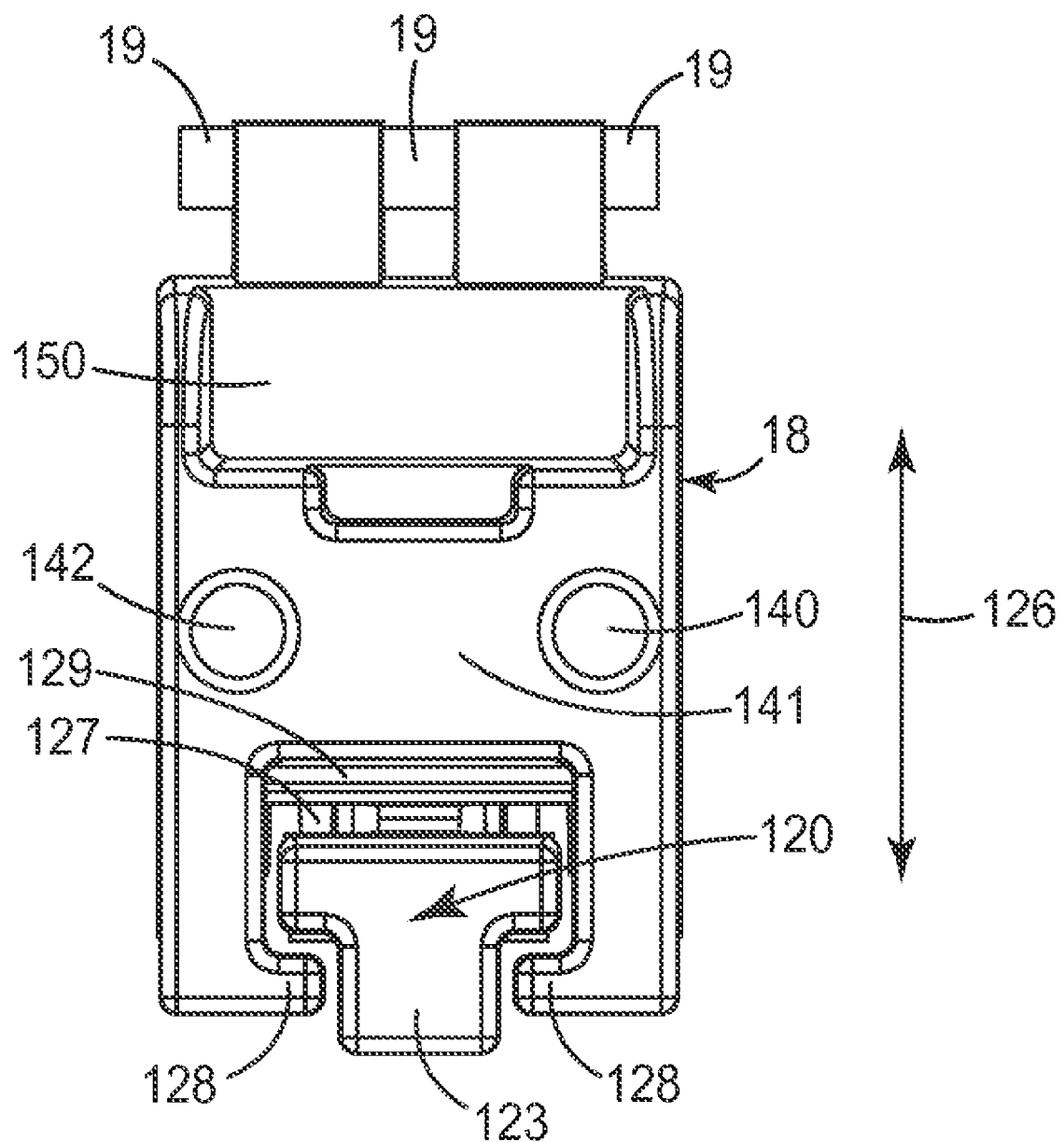
FIG. 5 is a top view of an exemplary cap according to another aspect of the invention.

In an alternative aspect, as is shown in FIG. 4D, cap 18 can include rear walls 114' that are formed with a smoothly recessed or scalloped back wall. The scalloped rear wall shape helps prevent the tip of an inserted wire from engaging the rear wall and thus being dislodged from its IDC element when the cap 18 is opened and closed over multiple cycles.

Figure 11:
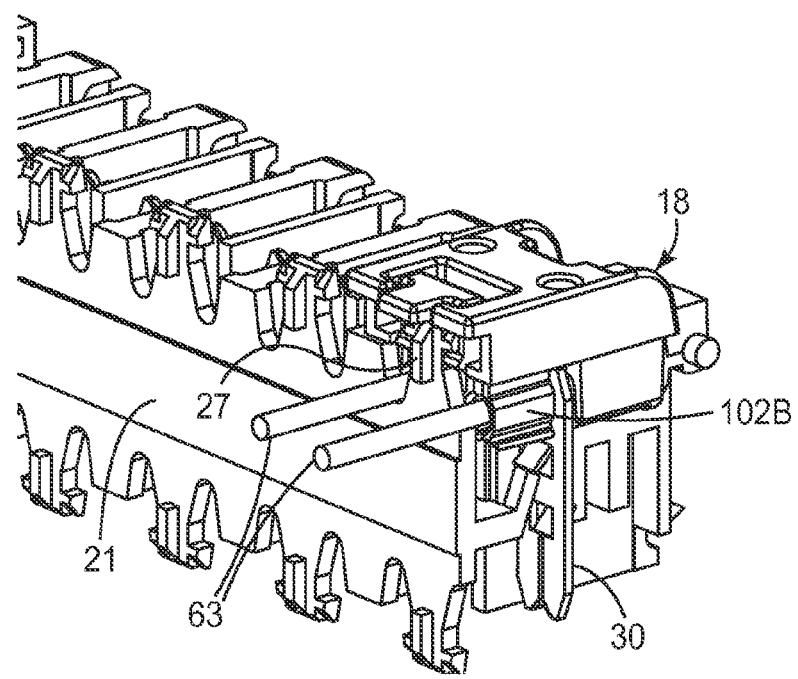
FIG. 11 is a close-up cut away isometric view of a portion of an electrical connector assembly and cap holding a wire pair in a closed position according to an aspect of the invention.

In addition, wire holders 102A, 102B each include a slit or split 104, that allows a wire received in the holding section to be transferred to and ultimately secured by the IDC element 30 (see e.g. FIGS. 10-12). Also, the wire holders 102A and 102B have sufficient flexibility such that when the cap is placed back in an open position (FIG. 12), the gripping force of the terminal's substantially U-shaped slots 93 is greater than the gripping force of the wire holders 102A, 102B—as described below, wire 63 will remain held by the substantially U-shaped slot 93 while the cap is translated to an open position, as the slit or split 104 will open to allow the wire 63 to remain in place in the IDC element.

For example, as shown in FIG. 4C, in an alternative aspect, the wire holders 102A, 102B can each further include respective through-slots 104A and 104B cut into the cap body 101 and disposed substantially opposite to splits 104. These additional through-slots 104A and 104B allow the wire holder legs, e.g., legs 102B' and 102B" to flex independently of each other.

In addition, each split side of the wire holder can further include a flared lower portion 106, with surfaces flaring away from the split 104. The flared lower portion provides for the cap 18 to return to a closed position in a more straightforward manner while a wire is secured in the substantially U-shaped slot 93 of the IDC element 30 without displacing or dislodging the wire from being secured by the IDC element 30 (and thus not affecting electrical connectivity).

Figure 8:
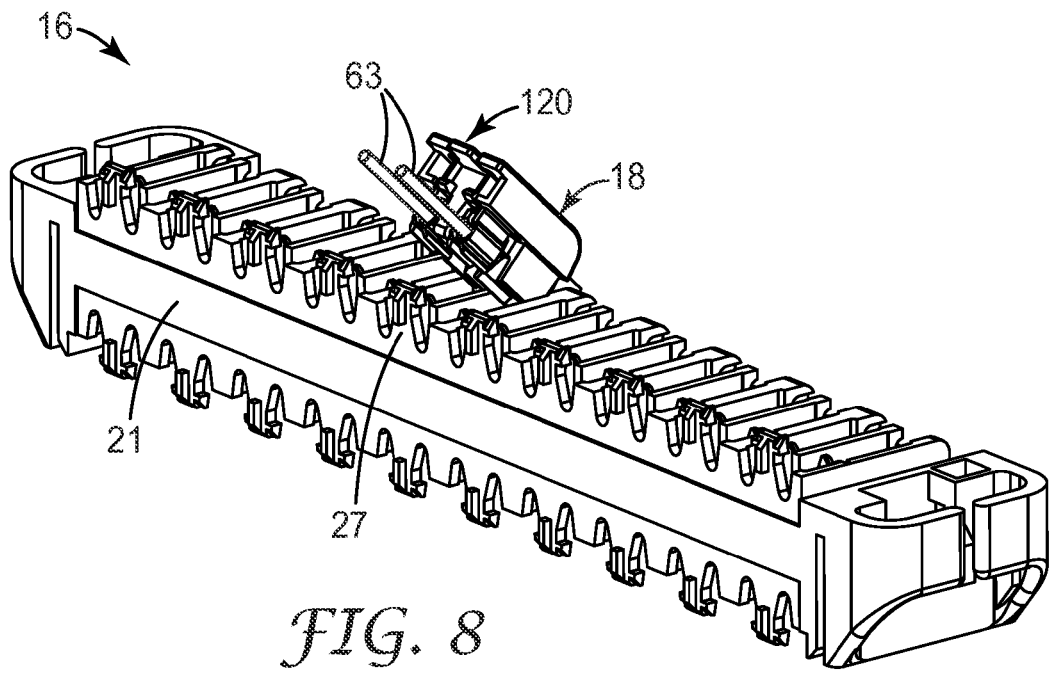
FIG. 8 is an isometric view of an exemplary electrical connector assembly and cap in an open position holding a wire pair according to another aspect of the invention.
Figure 9:
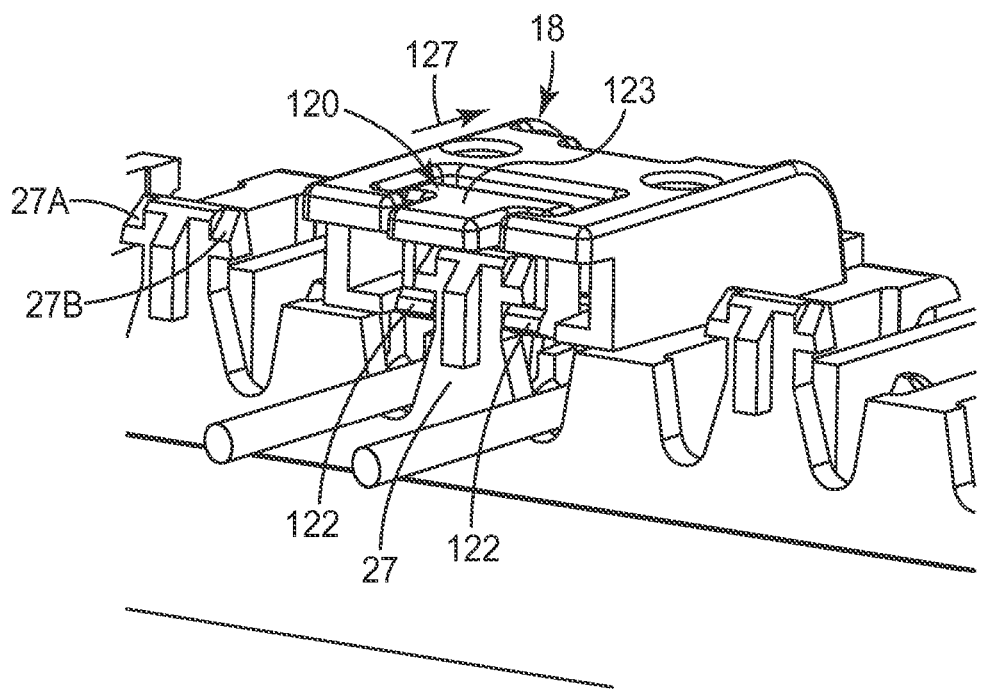
FIG. 9 is a close-up isometric view of a portion of an exemplary electrical connector assembly and cap in a closed position according to another aspect of the invention.

As mentioned above, cap 18 also includes a latching mechanism 120. In a preferred aspect, the latching mechanism 120 is a molded integral part of the cap 18. As shown in the isometric views of FIGS. 4A and 6, the cap latching mechanism comprises an elastic post-like member 124 having a detent surface. In addition, protrusions or latching ears 122 can be formed on the detent surface thereof. As is shown in FIGS. 8, 9 and 11, the latching ears 122 are configured to engage a boss, such as T-shaped post 27, formed in the base 21 to maintain the cap 18 in a closed position. Boss or T-shaped post 27 may be rigid or flexible. Post 27 may also have a different shape than a T-shape, where the particular shape can be configured to engage the latching mechanism and maintain the cap in a closed position unless specifically acted upon by the technician.

In one aspect, post 27 comprises an elastic cantilever beam structure that includes protrusions 27A and 27B to engage corresponding latching ears 122 to prevent the cap from accidentally opening. In one aspect, the outer edges of protrusions 27A and 27B can be chamfered. In a preferred aspect, cap latch post 124 has sufficient flexibility to be displaced or flexed in either direction along axis 126 shown in FIGS. 5 and 7. Movement forward and aft can be very minor (e.g., about 0.01 to 0.02 inches) and still provide sufficient displacement. For example, when the cap 18 is lowered into a closed position, latch post 124 can be moved inward to permit T-shaped post 27 to pass over the post 124. In a preferred aspect, an audible "snap" sound can be achieved as the latching ears 122 engage the T-shaped post 27. De-latching can be accomplished simply by applying a modest inward thumb or finger force to tab 123. For example, by pressing tab 123 inward, the latching ears can be released from the T-shaped post 27 and the cap 18 can be moved upward towards the open position.

Latching mechanism 120 further includes integral travel limits, such as stop projections 128 formed on a top surface of cap 18, which can limit the displacement of the latching post 124 in an outward direction. Displacement of the latching mechanism inward (toward the back wall 114) is provided by opening 127 formed in the top surface of cap 18, where the opening 127 is bounded in part by a cap rear wall 129. Thus, latching mechanism 120 has limited back-and-forth travel, reducing the likelihood of an accidental break during opening or closing. Opening 127 can also be configured to prevent excessive side-to-side motion.

In another alternative aspect, the cap 18 can include a generally flat surface pressure point provided as far from the rear pivot 19 as is practically possible in order to gain a greater mechanical leverage to overcome the force required to insert the wires in the IDC elements. In another further alternative, the top portion of the latch (e.g., tab 123) can be positioned at a height slightly lower than the remaining upper surface of the cap to reduce excessive pressure being applied to the latching mechanism 120 during the closing process.

As mentioned above, cap 18 can optionally include a test access area 140 and a visual inspection area 150. In a preferred aspect, test access area 140 can include one or more openings, such as openings 141 and 142 that permit access to the IDC elements (see e.g., FIGS. 5 and 7). For example, openings 141 and 142 can be of sufficient size to permit access by a test probe(s) directly onto IDC elements while the cap is in a closed position. Other shapes for the openings 141 and 142 can be utilized.

Additionally, cap 18 can include a visual inspection area 150 to permit a user to visually inspect or verify the position of the installed wires. The visual inspection area 150 can comprise an opening or openings, such as openings 151 and 152, or a substantially transparent material (e.g., a window or the like) located over the expected wire position to permit visual inspection. Alternatively, the visual inspection area can be provided on another side of the cap. The visual inspection area can allow a user to inspect wire conditions without having to open the cap. For example, a user can inspect the wires to see if, after installation, each wire has an end positioned proximate to the rear wall 114, 114' of the cap. This visual inspection area helps increase the likelihood that a wire will be correctly inserted in the IDC element.

In operation, electrical connector assembly 16 can be disposed in a cross connect cabinet, vault, hand-hole, or closure, such as in an outside plant portion of a telecommunications network, which is often a densely packed environment (with blocks spaced about one inch or less apart), where it can be physically difficult to insert wires. With the cap 18 of the exemplary embodiments described above, wires can be installed in a straightforward manner by using the cap 18 at a convenient angle, then closing the cap with a modest finger/thumb force. In addition, this connection scheme can be accomplished without requiring a special tool. For example, as illustrated with regards to FIGS. 10-12, a set of wires can be installed and connected in the following manner. Please note that multiple rows of other blocks are omitted from view for simplicity.

As shown in the cut out view of FIG. 10, a cap can be placed in an open position to expose the wire holders 102. The wire(s) (typically a twisted pair) can be inserted into the openings of the respective holders until the ends of the wires are brought in close proximity to, or preferably contact, the rear wall portion 114 (or 114') of the cap 18. The cap 18 can be rotated into a closed portion (see FIG. 11) by applying a finger/thumb pressure on the top surface of the cap. The closing force can be applied until the latching mechanism 120 engages the T-shaped post 27 of the body 21 (e.g., an audible snap or click sound can occur). After closing the cap 18, as shown in FIG. 11, the wires 63 are secured in the IDC elements 30 (in this example, wires 63 are engage by the upper portion 91 of element 30, whereas corresponding wires to be connected would be secured in the lower portion 92 of IDC elements 30). The installer can then check wire positioning by viewing the IDC element compartment through the visual inspection area of the cap 18. Alternatively, as shown in FIG. 12, the cap 18 can be returned to an open position as wires 63 remain secured by and in contact with IDC elements 30. For example, tab 123 can be depressed inward to release the cap from engaging the T-shaped post 27. A modest upward force can be applied to cap 18 to place it in the open position without disengaging the wires from the IDC elements. In a further aspect, cap 18, after returning to the open position, can receive an additional set of wires to connect with the wires 63 already inserted in the corresponding IDC elements.

As is apparent from the above description, installation and connection of the twisted pair wires can be accomplished without the need for a special tool or specialized craft skill. In addition, wire replacement can be accomplished without damage to the cap.

In an alternative embodiment, the terminal block that has connected the first set of wires 23 and the second set of wires 63 can be further electrically connected to additional sets of wires. For example, as shown in FIG. 13, an additional element, such as a jumper element 40, can be used to connect wire pairs 23 and 63 to an additional wire pair or additional wire pairs. The jumper element 40 can further include a cap 18' constructed in a manner similar to that described above. The body of jumper 40 can include splicing contacts (not shown) that connect the jumper element to the IDC element 30.

In a further alternative, as is shown in FIG. 14, a cap 18" can be disposed on a protection module 42, which can be disposed on some or all of the terminal blocks to prevent or reduce the damage to the wires and other relevant elements caused by sudden increase of voltage or current in the wire (e.g., over-voltage and/or overcurrent protection), such as caused by lightning strikes. Protection module 42 is preferably formed from an insulative material, such as those insulative materials described above, and can include further a grounding contact. Also, the protection module can include a voltage-limiting element such as a DIAC or a bi-directional trigger diode, which is insulative in the normal state, and turns into the short circuit state when the voltage exceeds a predetermined value. The construction of the jumper module 40 and the protection module 42 can be similar to that described in pending PCT Publication No. WO 2007/102983, incorporated by reference herein in its entirety.

Both jumper 40 and protection module 42 can include latching mechanisms such as those described above for coupling the elements to the block body 21 as would be apparent to one of skill in the art given the present description.

Figure 15:
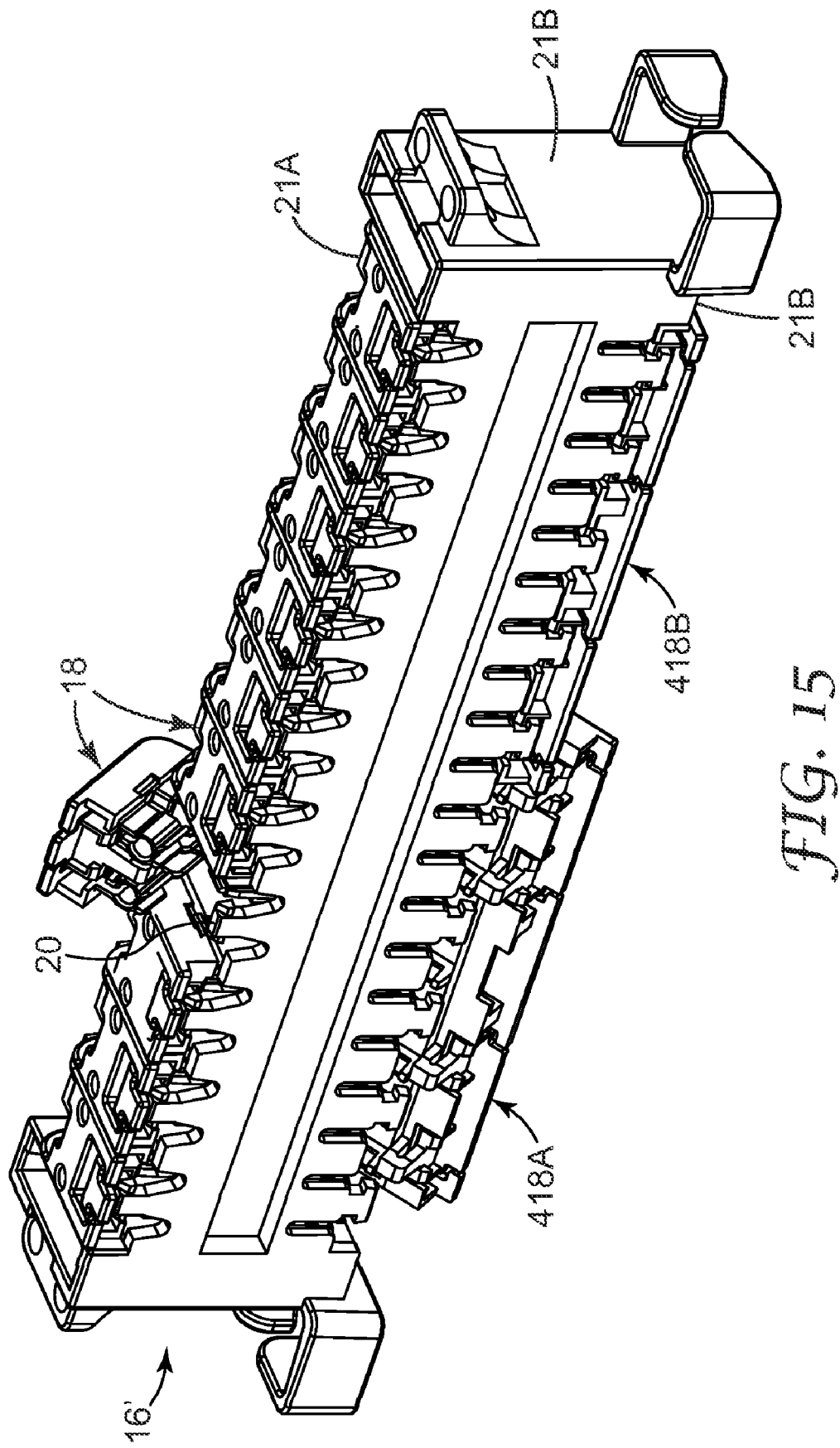
FIG. 15 is an isometric view of an alternative electrical connector assembly according to an aspect of the invention.

As mentioned above, the cross connect block can include a base and a plurality of covers or caps arranged on upper and lower sides of the base 21. For example, FIG. 15 shows another cross connect block 16' that includes a first set of caps 18 arranged on an upper, or "jumper," side 21A of the base 21 and a second set of caps, including multi-pair caps 418A and 418B disposed on the lower, or "cable," side 21B of base 21. Caps 418A and 418B are multi-pair caps, meaning that each multi-pair cap can cover a plurality of terminal compartments. As shown in FIG. 15, multi-pair cap 418A is shown in an open position and multi-pair cap 418B is shown in a closed position. Multi-pair caps 418A and 418B can include a plurality of individual caps integrally formed together, all similar in construction to caps 18 described above, or the caps can have an alternative design.

Figure 16A:
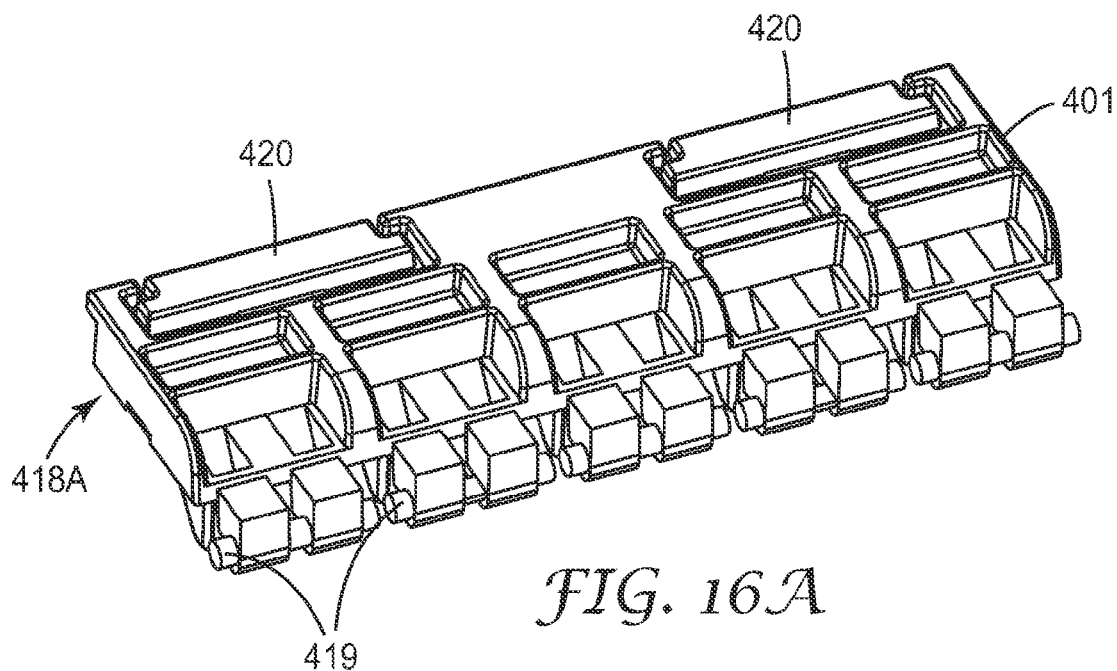
FIG. 16A is an isometric top view of an alternative multi-pair cap according to an aspect of the invention.
Figure 16B:
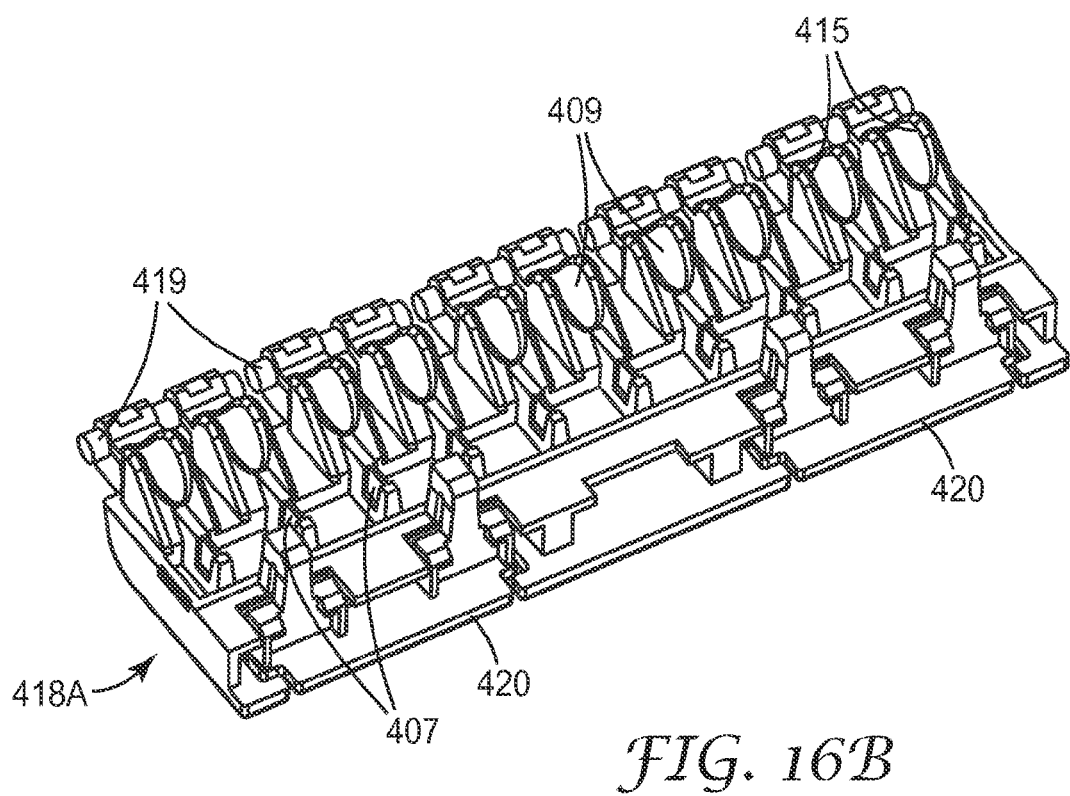
FIG. 16B is an isometric bottom view of an alternative multi-pair cap according to an aspect of the invention.

For example, FIGS. 16A and 16B show an alternative cap 418A having a gel displacement feature. In more detail, exemplary cap 418A is shown in top view in FIG. 16A. In this aspect, multi-pair cap 418A is configured to cover five different terminal compartments. Alternatively, cap 418A could be designed to cover fewer or a greater number of terminal compartments. Cap 418A includes a general body portion 401 and a latching mechanism 420. Main body portion 401 can be formed from the materials described above with respect to cap 18, and can be substantially transparent or opaque. In this alternative aspect, latching mechanism 420 operates to release the front of cap 418A from the block 21 by depressing dual tabs. Cap 418A can be coupled, e.g., pivotally mounted, to base 21 via a set of trunnions or pivots 419 engaging a corresponding set of trunnion mounts or pivot mounts formed on base 21.

In addition, as is shown in further detail in FIG. 16B, a bottom portion of cap 418 can include a plurality of ramped wire guides 415. As mentioned above, each terminal compartment can be filled with a sealant, such as a conventional gel (examples are listed above), to help prevent moisture from entering the terminal compartment and corroding the terminal. In this aspect, the ramped wire guides 415 are shaped with a pushing slope to force gel movement during cap closure toward the IDC element housed in the compartment. This gel displacement helps better ensure that an adequate amount of gel contacts the wire-IDC connection point.

In one aspect, wires can be inserted on the cable side 21B of the base using a specific wire insertion tool. As shown in FIG. 16B, protrusions 407 can also be provided on the underside of cap 418 to help maintain the placement of the inserted wires in the openings of the IDC elements and to help prevent complete dislodgement of those wires. In addition, the cap 418 can also include guide cavities 409 formed in the ramped wire guides 415 which can receive the wires and help maintain the transverse positions of the wires as they are inserted/connected in the terminal compartment.

Figure 17:
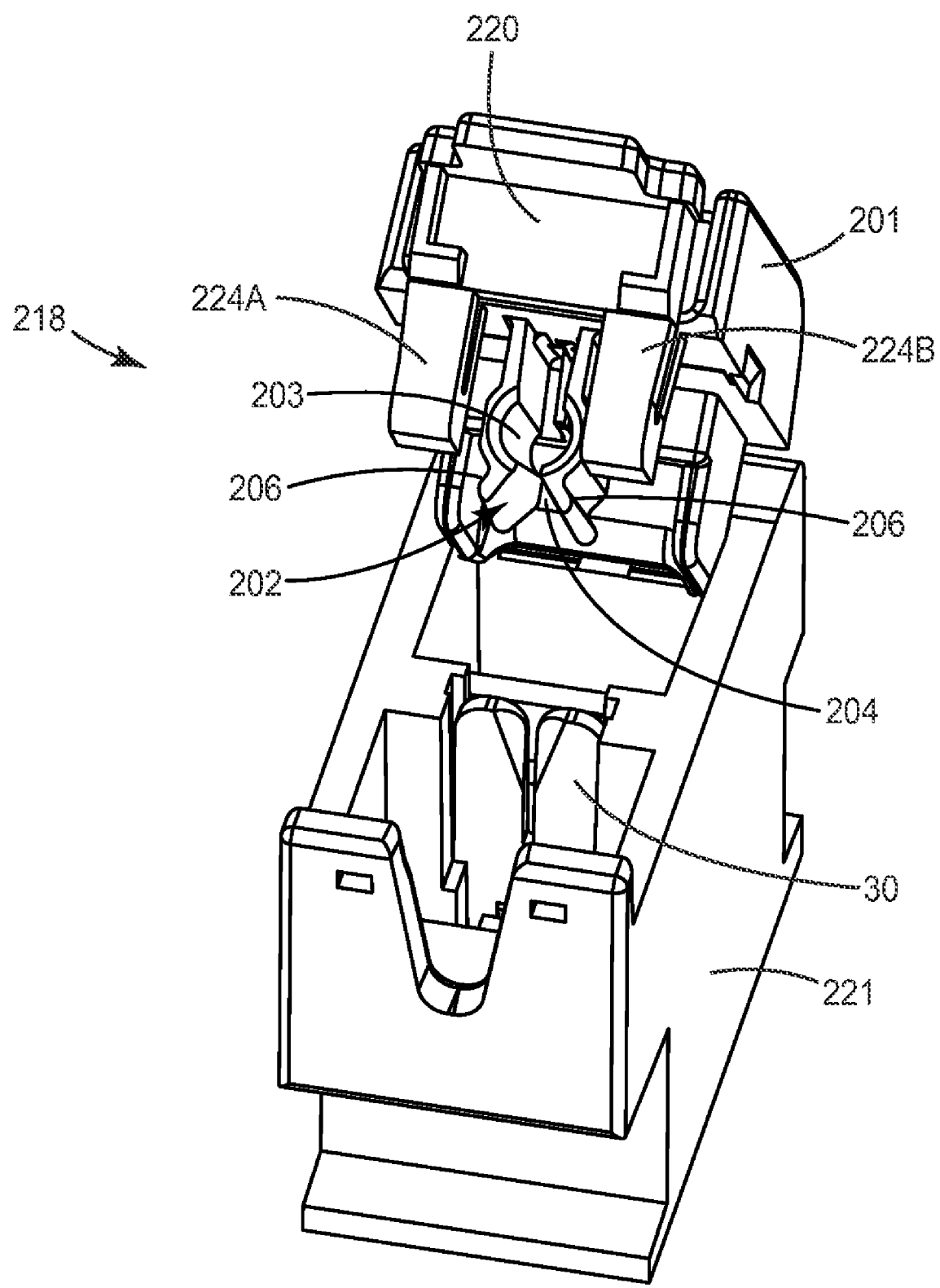
FIG. 17 is an isometric view of an alternative cap according to an aspect of the invention.

As mentioned above, the connector assembly of the present invention can be modified to connect a single wire or single wire sets as well using a single wire cap or set of single wire caps. For example, FIG. 17 shows an alternative cap 218 configured to receive and hold a single wire. Cap 218 includes a general body portion 201, a wire retention portion 202 and a latching mechanism 220. Optionally, cap 218 can further include a test access area and a visual inspection area (not shown). Main body portion 201, which can be formed from an insulative material, has a generally rectangular shape to cover the IDC terminal compartment of base 221, which can be part of a cross connect block or can be a separate structure connectable to a printed circuit board or other electrical or telecommunications device. The terminal compartment can also be filled with a sealant, such as a conventional gel, to help prevent moisture from entering the terminal compartment and corroding the terminal. The cap 218 may be constructed of an engineering plastic such as those described above. In one aspect, the material used to form cap 218 can be substantially transparent. In another aspect, material used to form cap 218 can be opaque.

While base 221 shown in FIG. 17 only shows one IDC compartment and one cap, as would be apparent to one of skill in the art given the present description, base 221 could include multiple IDC element compartments and multiple corresponding caps without departing from the scope of the invention.

Cap 218 includes a wire retention portion 202, in this embodiment, a single wire holder. The wire holder 202 has a generally cylindrical or tubular shape, with an opening 203 having a size configured to receive and support a conventional wire, such as those described above. As shown, the wire holder is preferably positioned below the top surface of the cap and is aligned with the IDC element 30 disposed in the base 221.

In one operation, a wire can be inserted through opening 203 until the end of the wire reaches a back-wall portion of cap 218 (not shown). The cap 218 can also include an opening or transverse gap (not shown) that is configured to receive the IDC element 30 as the cap is being closed, such that when the cap is moved to a closed position on the base 221, the transverse gap is in a corresponding position to the IDC element 30. The width of the transverse gap of the cap is slightly greater than the thickness of the IDC element 30. Thus, similar to that described above, the cap 218 can be opened and closed repeatedly without directly contacting the IDC element 30.

In addition, wire holder 202 can include a slit or split 204, that allows a wire received in the holding section to be transferred to and ultimately secured by the IDC element 30. Also, the wire holder 202 can have sufficient flexibility such that when the cap is placed back in an open position (as is shown in FIG. 17), the gripping force of the substantially U-shaped slots of the IDC element is greater than the gripping force of the wire holders 202. Thus, when the cap 218 is translated from a closed position to an open position, the slit or split 204 will open to allow the connected wire to remain in place in the IDC element.

In addition, each split side of the wire holder can further include a flared lower portion 206, with surfaces flaring away from the split 104. The flared lower portion provides for the cap 218 to return to a closed position in a more straightforward manner while a wire is secured in the IDC element 30 without displacing or dislodging the wire from being secured by the IDC element 30 (and thus not affecting electrical connectivity).

Cap 218 also includes a latching mechanism 220. In this alternative aspect, the latching mechanism 220 comprises a pair of elastic post-like members 224A and 224B having protrusions that are configured to detachably engage the base 221 when the cap is placed in a closed position. The cap can be maintained in a closed position unless the latching mechanism is specifically acted upon by the technician.

In another alternative aspect, the base structure holding the IDC element can be a separate structure connectable to a printed circuit board (PCB) or other electrical or telecommunications device. In this manner, the exemplary caps described herein can be utilized for the direct connection of wires to a PCB or other device.

Figure 18A:
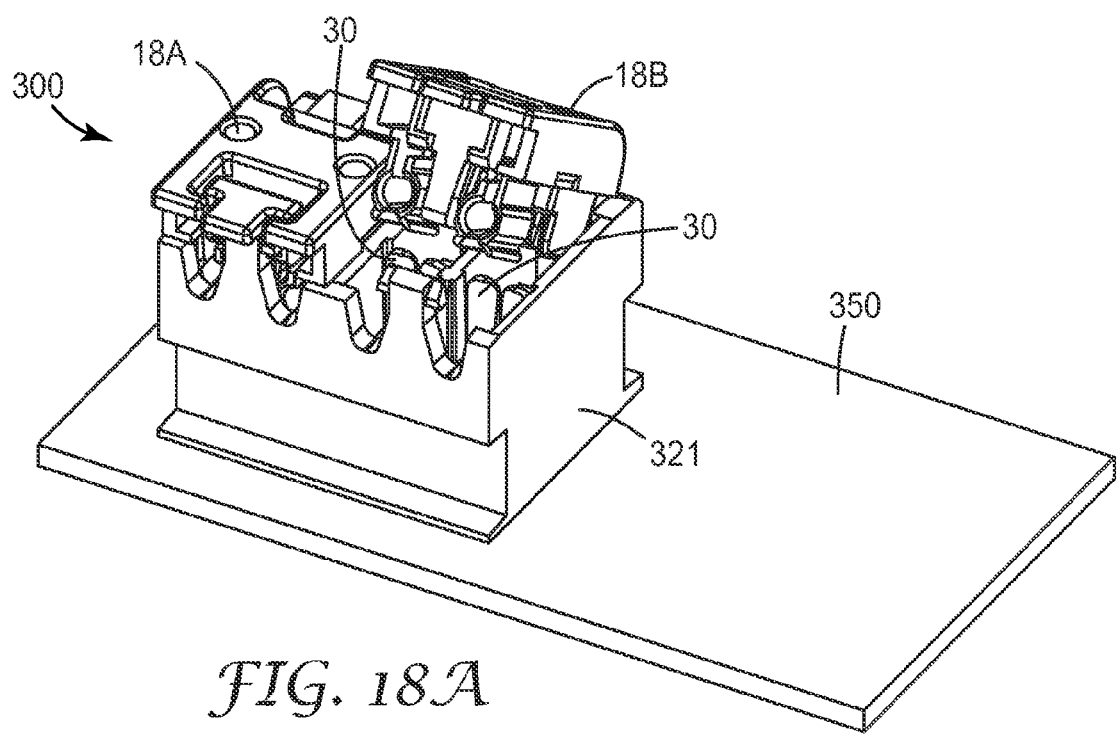
FIG. 18A is an isometric view of a connector assembly of an alternative aspect of the invention coupled to an electrical device.
Figure 18B:
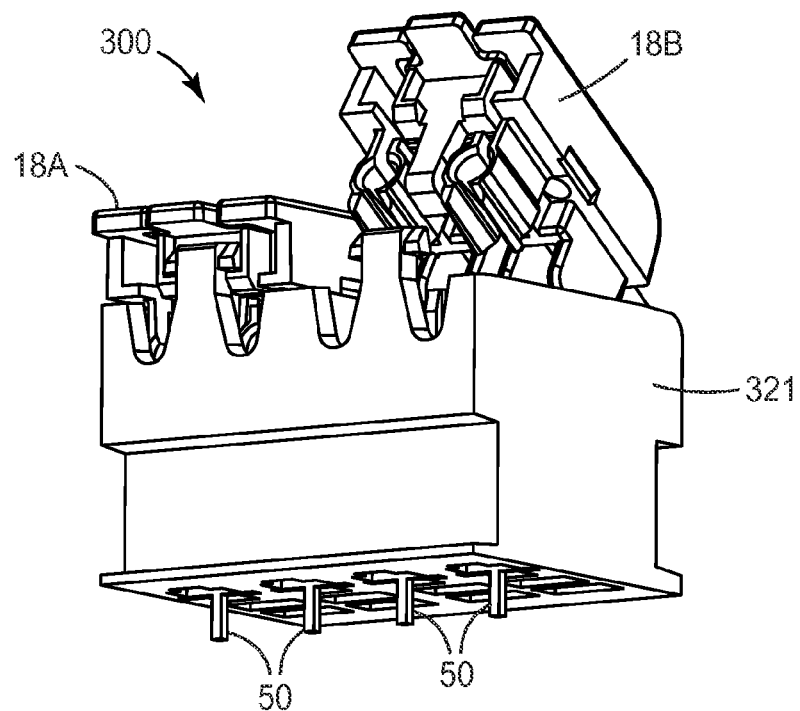
FIG. 18B is another view of the connector assembly of FIG. 18A.

For example, FIG. 18A shows an exemplary connector assembly 300 mounted on a PCB 350. The connector assembly 300 includes a base 321 that houses one or more IDC connectors 30 that are used to couple an incoming wire to the PCB. The IDC element compartment is covered by a cap 18A (in a closed position) or cap 18B (in an open position). The terminal compartment can also be filled with a sealant, such as a conventional gel, to help prevent moisture from entering the terminal compartment and corroding the terminal. Caps 18A and 18B can be constructed in the same manner as described above with respect to cap 18. As shown in FIG. 18B, the ID elements can each further include a post-like conductor 50 that extends from a bottom portion of base 321. These posts 50 can be directly connected to the PCB 350 or to corresponding receptacles of another electrical or telecommunications device.

As electrical conductors are typically coupled to the connector assemblies in the field, it is advantageous to simplify the installation/connection process. For example, the conditions of use and installation may be harsh, such as outdoors (i.e., unpredictable weather conditions), underground cabinets (i.e., tight working quarters), and non-highly skilled labor. According to the exemplary embodiments described herein, the multi-purpose cap can be utilized on the IDC block to reduce complications.

Although the present invention has been described with reference to preferred embodiments, workers skilled in the art will recognize that changes may be made in form and detail without departing from the scope of the invention.

What is claimed is:

1. A multi-pair cap movably mountable to a base portion of an IDC block, the cap configured to cover multiple IDC element pairs and multiple, gel-filled terminal compartments, each compartment having first and second IDC elements forming a first IDC element pair, comprising:
    a general body portion having an elongated cover configured to cover a plurality of gel-filled terminal compartments and a plurality of IDC element pairs,
    a gel displacement portion formed on an underside of the general body portion that includes a plurality of ramped wire guides each shaped with a pushing slope to force gel disposed within the terminal compartment to move toward an IDC element housed in the terminal compartment, and
    a latching mechanism to releasably fasten the cap to the housing when the cap is placed in a closed position.

2. The cap of claim 1, wherein the latching mechanism includes one or more depressible tabs.

3. The cap of claim 1, wherein the general body portion includes a set of pivot mechanisms engageable with the base portion of the IDC block.

4. The cap of claim 1, further comprising a plurality of guide cavities formed in the ramped wire guides that are configured to receive one or more wires.

* * * * *